(12) United States Patent
Muraoka et al.

(10) Patent No.: US 8,047,513 B2
(45) Date of Patent: Nov. 1, 2011

(54) FLUID FILLED TYPE VIBRATION DAMPING DEVICE

(75) Inventors: Mutsumi Muraoka, Aichi-gun (JP);
Hironori Koyama, Kasugai (JP)

(73) Assignee: Tokai Rubber Industries, Ltd., Komaki-shi (JP)

( * ) Notice: Subject to any disclaimer, the term of this patent is extended or adjusted under 35 U.S.C. 154(b) by 554 days.

(21) Appl. No.: 12/232,512

(22) Filed: Sep. 18, 2008

(65) Prior Publication Data
US 2009/0079118 A1 Mar. 26, 2009

(30) Foreign Application Priority Data

Sep. 21, 2007 (JP) ................................. 2007-246165
Dec. 27, 2007 (JP) ................................. 2007-337012

(51) Int. Cl.
*F16M 13/00* (2006.01)
(52) U.S. Cl. .................. 267/140.14; 267/140.15
(58) Field of Classification Search .............. 267/140.14, 267/140.15
See application file for complete search history.

(56) References Cited

U.S. PATENT DOCUMENTS

| | | | | |
|---|---|---|---|---|
| 4,877,225 A | * | 10/1989 | Noguchi et al. | 267/140.14 |
| 5,439,204 A | * | 8/1995 | Yamazoe et al. | 267/140.14 |
| 5,992,833 A | * | 11/1999 | Tanahashi | 267/140.14 |
| 6,422,546 B1 | | 7/2002 | Nemoto et al. | |
| 6,527,262 B2 | | 3/2003 | Hagino et al. | |
| 6,547,226 B2 | * | 4/2003 | Shores et al. | 267/140.11 |
| 7,165,761 B2 | | 1/2007 | Muraoka et al. | |
| 7,188,830 B2 | | 3/2007 | Kato et al. | |
| 7,255,335 B2 | | 8/2007 | Muraoka et al. | |
| 7,322,570 B2 | | 1/2008 | Maeno et al. | |

FOREIGN PATENT DOCUMENTS

| | | | |
|---|---|---|---|
| JP | A-01-093638 | | 4/1989 |
| JP | 04272533 A | * | 9/1992 |
| JP | A-06-330980 | | 11/1994 |
| JP | A-07-071506 | | 3/1995 |
| JP | A-11-101294 | | 4/1999 |
| JP | A-2000-213586 | | 8/2000 |
| JP | A-2003-339145 | | 11/2003 |
| JP | A-2005-291276 | | 10/2005 |
| JP | A-2006-097823 | | 4/2006 |

* cited by examiner

*Primary Examiner* — Thomas J Williams
(74) *Attorney, Agent, or Firm* — Oliff & Berridge, PLC

(57) ABSTRACT

A vibration damping device including: a pressure-receiving chamber and an equilibrium chamber connected by a first orifice passage; a movable member disposed within the pressure-receiving chamber, to form a primary fluid chamber partly defined by a rubber elastic body, and an auxiliary fluid chamber partly defined by an oscillating plate; and a second orifice passage connecting the auxiliary fluid chamber to the equilibrium chamber. A through-hole is formed in a partition member that partitions the primary fluid chamber and the auxiliary fluid chamber, the oscillating plate is housed within the through-hole with a gap provided therebetween whereby the oscillating plate is displaceable in an axial direction within the through-hole. A stopper abutted by the oscillating plate during displacement to one axial side is provided, with the gap becoming closed off when the oscillating plate is in a state of abutment against the stopper.

6 Claims, 7 Drawing Sheets

FLUID FILLED TYPE VIBRATION DAMPING DEVICE

INCORPORATED BY REFERENCE

The disclosure of Japanese Patent Application No. 2007-246165 filed on Sep. 21, 2007 and No. 2007-337012 filed on Dec. 27, 2007, each including the specification, drawings and abstract are incorporated herein by reference in their entirety.

BACKGROUND OF THE INVENTION

1. Field of the Invention

The present invention relates to a fluid filled vibration damping device adapted to provide active vibration damping action through control of pressure fluctuations of a pressure receiving chamber filled with a non-compressible fluid, wherein control is carried out in a cycle that corresponds to the frequency of the vibration to be damped.

2. Description of the Related Art

In the field of vibration damping devices such as vibration damping linkages or vibration damping supports designed for installation between components that make up a vibration transmission system, one type of known device is a fluid filled type vibration damping device having a first mounting member and a second mounting member linked by a rubber elastic body; a pressure-receiving chamber whose wall is partially defined by the rubber elastic body and an equilibrium chamber whose wall is partially defined by a flexible film, the pressure-receiving chamber and the equilibrium chamber being formed to either side of a partition member and filled with a non-compressible fluid; and an orifice passage connecting the pressure-receiving chamber and the equilibrium chamber. Since this type of fluid filled vibration damping device is able to exhibit vibration damping effect by using flow action, e.g. resonance action, of fluid flowing through the orifice passage, application of such devices in automotive engine mounts and the like is a current topic of interest.

However, one problem with such devices was that in order to for each of the orifice passages to achieve the orifice effect effectively, each orifice passage is limited to a pre-tuned, relatively narrow frequency range. Thus, in instances where frequency or other characteristic of vibration targeted for damping varies, or where advanced vibration damping action is required, difficultly in achieving satisfactory vibration damping action was a problem.

As one approach to solving this problem, in recent years, vibration damping devices of active type have been developed and are the subject of ongoing research. In such active vibration damping devices, typically, another part of the wall of the pressure-receiving chamber is defined by an oscillating plate, and through actuated oscillation of this oscillating plate at a cycle corresponding to the frequency of the vibration being damped, the pressure in the pressure-receiving chamber is controlled to produce positive and active vibration damping action. One such device is disclosed in U.S. Pat. No. 6,527,262, for example.

In the active type fluid filled vibration damping device disclosed in U.S. Pat. No. 6,527,262, the oscillating plate is linked to a second mounting member via a supporting rubber elastic body of annular shape, with the aim of elastically positioning and supporting the oscillating plate on the second mounting member while maintaining fluidtightness of the pressure-receiving chamber. For this reason, there was a risk that permanent set in fatigue of the supporting rubber elastic body might make it difficult to consistently achieve the desired vibration damping action. Additionally, since oscillation energy of the oscillating plate is consumed through deformation of the supporting rubber elastic body, there is a risk of diminished actuation efficiency of the oscillating plate.

In order to address such problems, it would be conceivable, for example, to employ an oscillating plate of piston construction as taught in Japanese Unexamined Patent Publication Nos. JP-A-06-330980 or JP-A-2005-291276. According to these fluid filled vibration damping devices, a through-hole of cylinder shape is formed in the partition member, a piston shaped oscillating plate is disposed at the distal end side of the output member of the actuator in the actuation direction, and the oscillating plate is movable in the axial direction along the inside peripheral face of the partition member constituting the peripheral wall of the through-hole. The gap provided between the outside peripheral face of the oscillating plate and the inside peripheral face of the partition member obviates the need for the supporting rubber elastic body to support the oscillating plate on the second mounting fitting, thereby solving the aforementioned problem stemming from the support structure for the oscillating plate via the supporting rubber elastic body.

However, a fluid filled vibration damping device furnished with such a piston shaped oscillating plate proved to have the problem that pressure in the pressure-receiving chamber leaks out through the gap between the inside peripheral face of the partition member and the outside peripheral face of the oscillating plate. Specifically, the problem of difficulty in achieving satisfactory orifice effect arose as a result of pressure leaking from the pressure-receiving chamber through the gap and reducing the level of fluid flow through the orifice passage.

The above-mentioned JP-A-06-330980 and JP-A-2005-291276 also teach making the gap sufficiently small in size. However, simply reducing the size of the gap does not readily prevent pressure leakage from the pressure-receiving chamber to a sufficient extent. Moreover, if the gap is too small, the oscillating plate may interfere with the inside peripheral face of the partition member, resulting in the risk of diminished actuation efficiency of the oscillating plate, of scratching or other damage to the opposed faces of the oscillating plate and the cylinder member, or of unwanted noise.

SUMMARY OF THE INVENTION

It is therefore one object of this invention to provide a fluid filled type active vibration damping device of novel construction which affords stable driving displacement of the oscillating plate, and thereby achieves effective vibration damping action.

The above and/or optional objects of this invention may be attained according to at least one of the following modes of the invention. The following modes and/or elements employed in each mode of the invention may be adopted at any possible optional combinations. It is to be understood that the principle of the invention is not limited to these modes of the invention and combinations of the technical features, but may otherwise be recognized based on the teachings of the present invention disclosed in the entire specification and drawings or that may be recognized by those skilled in the art in the light of the present disclosure in its entirety.

A principle of the present invention provides a fluid filled type vibration damping device including: a rubber elastic body elastically connecting a first mounting member and a second mounting member; a partition member supported on the second mounting member; a pressure-receiving chamber whose wall is partly defined by the rubber elastic body; an equilibrium chamber whose wall is partly defined by a flexible film, the pressure-receiving chamber and the equilibrium chamber being formed to either side of the partition member and filled with a non-compressible fluid; a movable member of limited displacement or limited deformation disposed within the pressure-receiving chamber, the pressure-receiving chamber being partitioned by the movable member thereby forming a primary fluid chamber whose wall is partly defined by the rubber elastic body and to which vibration is input, and an auxiliary fluid chamber whose wall is partly defined by the oscillating plate and whose pressure is controllable through actuated oscillation of the oscillating plate; a first orifice passage connecting the primary fluid chamber to the equilibrium chamber; and a second orifice passage connecting the auxiliary fluid chamber to the equilibrium chamber, the second orifice passage being tuned to a higher frequency range than the first orifice passage, wherein a through-hole is formed in the partition member that partitions the auxiliary fluid chamber and the equilibrium chamber, the oscillating plate is housed within the through-hole with a gap provided between an outside peripheral face of the oscillating plate and an inside peripheral face of the through-hole whereby the oscillating plate is displaceable in an axial direction within the through-hole, the wall of the auxiliary fluid chamber is partly defined by the oscillating plate, and a stopper abutted by the oscillating plate during displacement to one side in the axial direction is provided, with the gap becoming closed off when the oscillating plate is in a state of abutment against the stopper.

In the fluid filled type vibration damping device constructed according to the present invention, when vibration damping action is produced on the basis of flow action of fluid through the second orifice passage, the gap between the outside peripheral face of the oscillating plate and the inside peripheral face of the through-hole becomes closed off through abutment of the oscillating plate against the stopper. Pressure leakage from the pressure-receiving chamber through the gap is reliably prevented thereby, and sufficient fluid flow through the second orifice passage is assured so as to effective produce vibration damping action through the flow action of the fluid.

That is, according to this construction, the gap is reliably maintained in the closed off state by utilizing the abutting mechanism of the oscillating plate and the stopper in the direction of displacement of the oscillating plate. This obviates the need to design an excessively small gap for the purpose of preventing leakage of pressure from the pressure-receiving chamber, so that the gap can be designed with sufficient size tolerance such that the oscillating plate does not interfere with the through-hole. Thus, actuated displacement of the oscillating plate is stabilized; pressure leakage from the pressure-receiving chamber through the gap around the oscillating plate is reliably prevented; and the vibration damping performance afforded by the second orifice passage is improved.

According to one preferred mode of the fluid filled type vibration damping device of the present invention, wherein the stopper is provided in the through-hole at a side of towards which the oscillating plate displaces when moving from a pressure-receiving chamber side towards an equilibrium chamber side, pressure of the pressure-receiving chamber is exerted on a first face of the oscillating plate while pressure of the equilibrium chamber is exerted on another face of the oscillating plate, and with the oscillating plate abutting the stopper and closing off the gap, negative pressure arising in the pressure-receiving chamber when vibration is input displaces the oscillating plate from the equilibrium chamber side towards the pressure-receiving chamber side and place the gap in a communicating state. According to this construction, when impulsive and/or high load vibration is input and gives rise to excessive negative pressure in the pressure-receiving chamber, the gap assumes the communicating state due to displacement of the oscillating plate by the action of the negative pressure, thereby short-circuiting the pressure-receiving chamber and the equilibrium chamber through the gap. The condition of excessive negative pressure in the pressure-receiving chamber is eliminated thereby, and noise associated with formation of cavitation bubbles caused by a sustained condition of excessive negative pressure can be reduced. Consequently, according to this construction, since there is no need to provide a special short-circuiting mechanism for short-circuiting the pressure-receiving chamber and the equilibrium chamber under conditions of excessive negative pressure arising in the pressure-receiving chamber, vibration damping action can be improved while keeping the number of parts to a minimum.

No particular limitation is imposed on an actuating member for actuating oscillation of the oscillating plate. It would be possible to employ, for example, a pneumatic actuator that uses atmospheric pressure or negative pressure, or an electromagnetic actuator that uses electromagnetic or magnetic force. For example, as a pneumatic actuator, it would be possible to utilize a construction that includes a working air chamber a portion of whose wall is defined by a rubber elastic body, and an output member provided to the rubber elastic body and linked to the oscillating plate, so that oscillation of the oscillating plate may be actuated through selective action of atmospheric pressure or negative pressure on the working air chamber and actuate the output member through elastic deformation of the rubber elastic body.

According to another preferred mode of the fluid filled type vibration damping device of the present invention, an electromagnetic actuator furnished with a coil member and an output member that receives actuating force through flow of electrical current to the coil member is used as the actuating member for actuating oscillation of the oscillating plate, with the electromagnetic actuator disposed on an opposite side of the oscillating plate from the pressure-receiving chamber, and with the output member penetrating through the flexible film and linked to the oscillating plate. According to this construction, a high degree of control of the oscillation mode and position of the oscillating plate can be possible through control of current flow to the coil member. Thus, in addition to affording consistent oscillating force, the oscillating plate can be rapidly displaced to the position abutting the stopper so that the gap between the oscillating plate and the through-hole can be rapidly closed.

According to another preferred mode of the fluid filled type vibration damping device of the present invention, a plate spring that extends in an axis-perpendicular direction is positioned between the oscillating plate and the partition member, with the oscillating plate being elastically linked to and supported in the axial direction on the partition member through the plate spring. According to this construction, axis-perpendicular direction displacement and twisting displacement of the oscillating plate with respect to the partition member can be suppressed, and a satisfactory gap may be maintained all the way around the circumference between the outside peripheral face of the oscillating plate and the inside peripheral face of the through-hole, thus effectively preventing the oscillating plate from interfering with the through-hole.

According to yet another preferred mode of the fluid filled type vibration damping device of the present invention, a cushioning member is disposed on at least one of abutting portions of the oscillating plate and the stopper. Noise arising from contact of the oscillating plate and the stopper may be more advantageously inhibited thereby. Additionally, elastic deformation of the cushioning member may be utilized so that at least one of the oscillating plate and the stopper come into wedged abutment against the other, thereby improving fluidtightness between the abutting faces and blocking off the gap between the outside peripheral face of the oscillating plate and the inside peripheral face with a higher level of fluidtightness.

According to still another preferred mode of the fluid filled type vibration damping device of the present invention, wherein the through-hole is formed extending in a direction of opposition of the pressure-receiving chamber and the equilibrium chamber in a center section of the partition member, the wall of the equilibrium chamber is partly defined by an outside peripheral section of the partition member about the through-hole, and an outside peripheral face of the partition member has a tapered shape of decreasing diameter from a pressure-receiving chamber side at a first side thereof in the axial direction towards an equilibrium chamber side at another side in the axial direction. According to this construction, variable capacity of the flexible film in the equilibrium chamber is efficiently ensured, and the degree of freedom in design of the flexible film is improved, thereby affording further improvement in ability to tune to the desired vibration damping action.

BRIEF DESCRIPTION OF THE DRAWINGS

The foregoing and/or other objects, features and advantages of the invention will become more apparent from the following description of a preferred embodiment with reference to the accompanying drawings in which like reference numerals designate like elements and wherein.

DETAILED DESCRIPTION OF PREFERRED EMBODIMENTS

Figure 1:
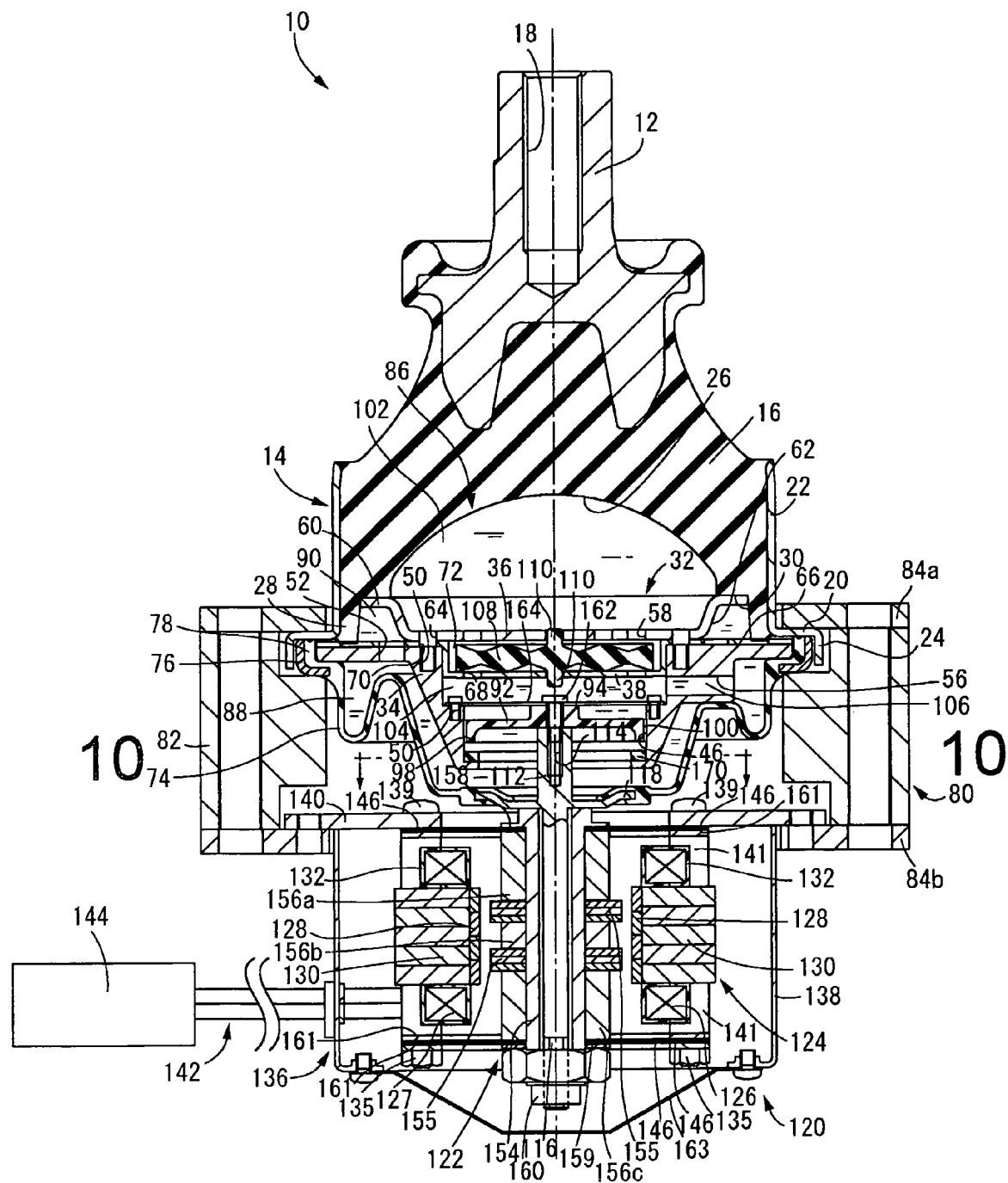
FIG. 1 is a vertical cross sectional view of a fluid filled type vibration damping device in the form of an automotive engine mount according to one embodiment of the present invention.

Referring first to FIG. 1, there is depicted an automotive engine mount 10 according to one embodiment of a fluid-filled type vibration damping device of the present invention. This engine mount 10 has a construction wherein a first mounting member 12 of metal and a second mounting member 14 of metal are linked by a main rubber elastic body 16. The first mounting member 12 is adapted to be mounted onto the vehicle's power unit (not shown), and the second mounting member 14 is adapted to be mounted onto an automobile body (not shown). The power unit is thereby elastically supported on the vehicle body via the intervening engine mount 10.

Whereas FIG. 1 depicts the engine mount 10 in isolation prior to installation in a vehicle, with the engine mount 10 installed in the vehicle, distributed load of the power unit is input in the mount axial direction (the vertical direction in FIG. 1), thereby inducing displacement of the first mounting member 12 and the second mounting member 14 in the direction closer together in the mount axial direction, whereupon the main rubber elastic body 16 elastically deforms. In this installed state, principle vibration targeted for damping is input approximately in the mount axial direction. In the description hereinbelow, unless indicated otherwise, vertical direction refers to the vertical direction in FIG. 1.

More specifically, the first mounting member 12 has an inverted bottomed round tubular shape or round post shape. A screw hole 18 which opens onto the upper end face is provided in the center section of the first mounting member 12. The first mounting member 12 is attached securely to the power unit by screw-fastening a member on the power unit side (not shown) to the screw hole 18 using a fastening bolt.

The second mounting member 14 has a large-diameter, generally stepped round tubular shape, with a small-diameter portion 22 extending upward from the inside peripheral edge of a shoulder portion 20 of annular plate shape, and a large-diameter portion 24 extending downward from the outside peripheral edge of the shoulder portion 20. The axial dimension of the small-diameter portion 22 is longer than the axial dimension of the large-diameter portion 24.

The first mounting member 12 and the second mounting member 14 are positioned coaxially with one another, with the first mounting member 12 positioned facing at a prescribed distance away in the axial direction the opening at the small-diameter portion 22 end of the second mounting member 14. The main rubber elastic body 16 is interposed between the first mounting member 12 and the second mounting member 14.

The main rubber elastic body 16 is a thick rubber elastic body of generally truncated conical shape. In the center portion of the lower end of the main rubber elastic body 16, there is formed a large-diameter recess 26 of inverted conical or semispherical shape opening downward. A section of the first mounting member 12 extending to its lower end from its axially medial portion is vulcanization bonded to the upper end of the main rubber elastic body 16 so as to be embedded therein, while the inside peripheral face of the small-diameter portion 22 of the second mounting member 14, at a section thereof extending to its axially medial portion from its upper end section, is juxtaposed against and vulcanization bonded to the outside peripheral face of the lower end of the main rubber elastic body 16. The main rubber elastic body 16 is thereby constituted as an integrally vulcanization molded component that integrally incorporates the first mounting member 12 and the second mounting member 14, and one of the openings of the second mounting member 14 (at top in FIG. 1) is sealed off fluid-tightly by the main rubber elastic body 16. The inside peripheral face of the small-diameter portion 22 of the second mounting member 14 is sheathed entirely from its axially medial section to its lower end section by a thin rubber seal layer 28 that is integrally formed with the main rubber elastic body 16. The rim of the open end of the large-diameter recess 26 in the main rubber elastic body 16 is situated inward in the axis-perpendicular direction from the inside peripheral face of the rubber seal layer 28, so that an annular step portion 30 of annular shape is formed in the boundary section between the main rubber elastic body 16 and the rubber seal layer 28.

A partition member 32 is attached in the opening section of the second mounting member 14 on its axial lower side. The partition member 32 overall has a generally round block shape, and includes a partition member body 34, a first dividing wall plate 36 and a second dividing wall plate 38. In this embodiment, the partition member 32 is made of metal material such as aluminum alloy or steel, but it could also be made from rigid synthetic resin material or the like.

Figure 2:
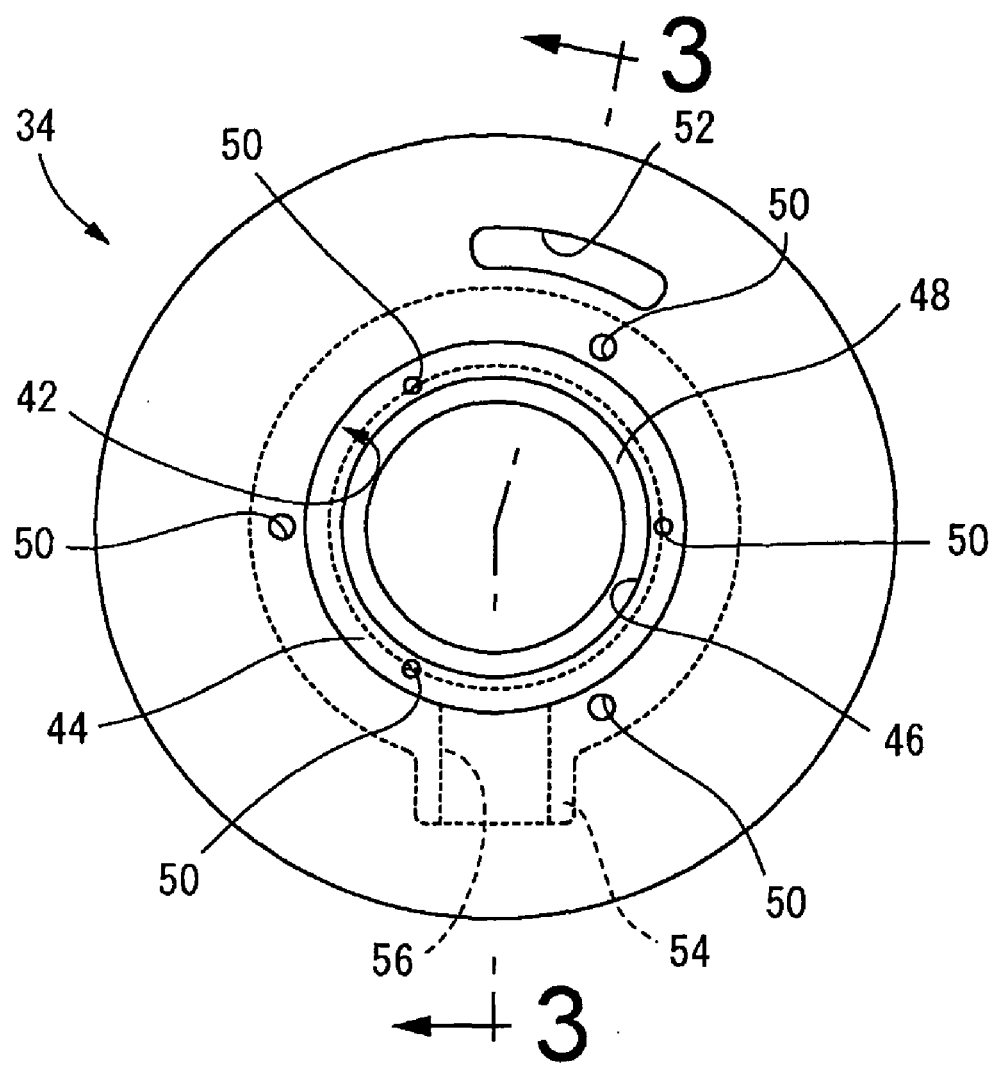
FIG. 2 is a top plane view of a partition member of the engine mount of FIG. 1.
Figure 3:
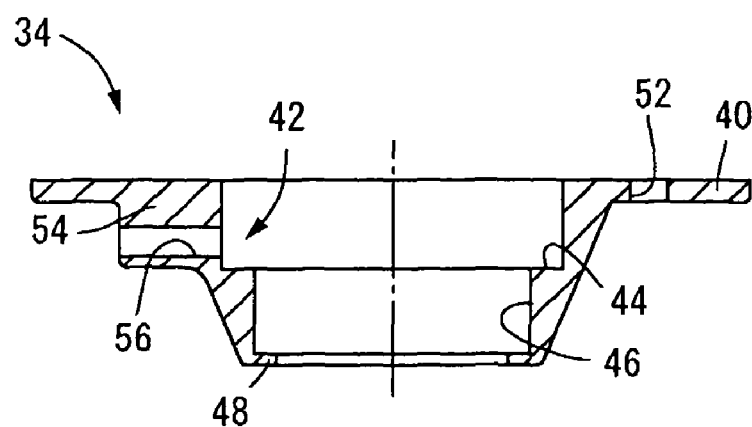
FIG. 3 is a cross sectional view taken along line 3-3 of FIG. 2.
Figure 4:
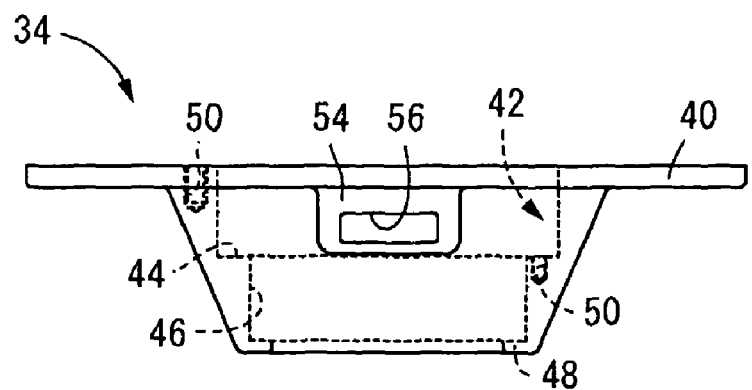
FIG. 4 is a top plane view of a partition member body of FIG. 2.

As depicted in FIGS. 2 to 4 as well, an outer flanged portion 40 of large-diameter annular shape is integrally formed at the upper edge section of the partition member body 34. The outside peripheral face of the partition member body 34 has a tapered shape gradually decreasing in outside diameter dimension from top to bottom.

A circular center hole 42 is formed extending in the axial direction through the center section of the partition member body 34 so as to penetrate the upper and lower end faces of the partition member body 34. A step portion 44 of annular shape is formed in the peripheral wall of the center hole 42 in its generally axial center section, with the diameter dimension of the center hole 42 in its upper section to one side of the step portion 44 being larger compared to the diameter dimension in its lower section. A through-hole 46 according to this embodiment is defined by this lower section of the center hole 42.

A stopper 48 is integrally formed at the lower opening section of the through-hole 46. The stopper 48 extends radially inward of the lower end peripheral portion of the through-hole 46 with a given cross sectional shape, over an entire circumference of the through-hole 46. Thus, the stopper 48 provides an inward flange in the partition member 32. As will be understood from the above, the through-hole 46 extend axially through the central portion of the partition member 32, i.e. the partition member body 34, and the outer peripheral portion about the through-hole 46 of the partition member 32 has a tapered shape of decreasing diameter from one axial side (at top in FIG. 1) toward the other.

A plural number of screw holes 50 are disposed prescribed distances apart in the circumferential direction, in the step portion 44 and around the upper rim of the center hole 42 in the partition member body 34. The diametrically medial section or outer peripheral section of the outer flanged portion 40 is perforated in the thickness direction (the vertical in FIG. 1) by a connecting window 52.

A block shaped portion 54 is disposed projecting diametrically outward from a single location along the circumference of the peripheral wall section of the partition member body 34, and a connecting passage 56 extends in tunnel form through the block shaped portion 54. The connecting passage 56 extends continuously with unchanging oblong cross section in the diametrical direction through the partition member body 34, with a first end (face) thereof opening onto the peripheral wall face of the center hole 42 of the partition member body 34 at a location above the step portion 44, and with the other end (face) opening onto the diametrically outward end face of the block shaped portion 54.

The first dividing wall plate 36 has a shallow, generally circular saucer shape whose base portion is penetrated by through-holes 58 composed of a plurality of small holes; and a rimming portion 60 of annular shape is integrally formed at its upper lip. The rimming portion 60 extends parallel to the base portion of the first dividing wall plate 36, at a location above the base portion. The outside diameter dimension of the base portion of the first dividing wall plate 36 is large in comparison with the diameter dimension of the large-diameter section at the upper side of the center hole 42 of the partition member body 34, and insertion holes 64 are formed penetrating the outside peripheral section of the base portion at locations corresponding to the screw holes 50 of the partition member body 34.

Meanwhile, the second dividing wall plate 38 has a shallow, generally bottomed cylindrical shape, with a large-diameter outer flanged portion 66 formed at the lip of the opening. In other words, the second dividing wall plate 38 has the form of a thin circular disk shape with a circular recess formed in its center section. The outside diameter dimension of the outer flanged portion 66 is approximately identical to the outside diameter dimension of the outer flanged portion 40 of the partition member body 34, and is larger in comparison with the outside diameter dimension of the rimming portion 60 of the first dividing wall plate 36. The outside diameter dimension of the peripheral wall of the second dividing wall plate 38 is slightly smaller than the diameter dimension of the large-diameter section at the upper side of the center hole 42 of the partition member body 34. Furthermore, the axial length of the peripheral wall of the second dividing wall plate 38 is smaller in comparison with the axial length of the large-diameter section. Through-holes 68 composed of a plurality of small holes are formed penetrating the base portion of the second dividing wall plate 38. Additionally, insertion holes 70 are formed penetrating the diametrically medial section or inside peripheral section of the outer flanged portion 66, at locations corresponding to the screw holes 50 of the partition member body 34 and to the insertion holes 64 of the first dividing wall plate 36.

The peripheral wall of the second dividing wall plate 38 is slipped into the upper opening section of the center hole 42 of the partition member body 34, and the outer flanged portion 66 of the second dividing wall plate 38 is juxtaposed against the outer flanged portion 40 of the partition member body 34. Furthermore, the outside peripheral section of the base of the first dividing wall plate 36 is juxtaposed against the diametrical inside peripheral section or medial section of the outer flanged portion 66 of the second dividing wall plate 38, while the screw holes 50 of the partition member body 34, the insertion holes 70 of the second dividing wall plate 38, and the insertion holes 64 of the first dividing wall plate 36 are aligned overlapping one another in the axial direction. Fastening bolts are then passed through the insertion holes 64, 70 in the first and second dividing wall plates 36, 38, and fastened by screwing into screw holes 50 of the partition member body 34. The partition member 32 constituted thereby has a form in which the upper opening of the center hole 42 of the partition member body 34 has been covered by the first and second dividing wall plates 36, 38. The base portion of the second dividing wall plate 38 and the step portion 44 of the center hole 42 in the partition member body 34 are now positioned in opposition a prescribed distance apart in the axial direction.

The rimming portion 60 of the first dividing wall plate 36 and the outer flanged portion 66 of the second dividing wall plate 38 are positioned in opposition a prescribed distance apart in the axial direction, with the lower end face of the rimming portion 60, the outside peripheral face of the peripheral wall of the first dividing wall plate 36, and the upper end face of the outer flanged portion 66 cooperating to define a peripheral groove 62 having a cross section that opens with slot contours diametrically outward in the outside peripheral section of the partition member 32, and extends continuously all the way around its circumference.

Furthermore, by covering the opening section of the second dividing wall plate 38 with the base portion of the first dividing wall plate 36, a circular zone 72 that extends with generally unchanging circular cross section in the axial direction is formed between the center of the base portion of the first dividing wall plate 36 and the center portion of the second dividing wall plate 38.

The partition member 32 of the above design is inserted in the axial direction into the second mounting member 14 from its bottom opening, and the rimming portion 60 of the first dividing wall plate 36 is juxtaposed against the annular step portion 30 of the main rubber elastic body 16, while the outside peripheral section of the outer flanged portion 66 of the second dividing wall plate 38 is juxtaposed against the shoulder portion 20 via the intervening rubber seal layer 28 of the second mounting member 14. With this arrangement, the inserted end of the partition member 32 in the axial direction is regulated with respect to the second mounting member 14.

A diaphragm 74 (the flexible film) is disposed below the partition member 32. The diaphragm 74 is formed from a thin circular rubber film having ample slack. A fastener fitting 76 is vulcanization bonded to the outside peripheral edge of the diaphragm 74. The fastener fitting 76 has a design with an inner flanged portion that projects diametrically inward integrally disposed at the lower end section of a large-diameter ring. The diaphragm 74 is vulcanization bonded at its outside peripheral edge to the inside peripheral edge of the fastener fitting 76, while a thin seal rubber layer 78 that is integrally formed with the diaphragm 74 is vulcanization bonded over generally the entire inside peripheral face of the fastener fitting 76.

The fastener fitting 76 is slipped inside the second mounting member 14 in the axial direction from the opening on its lower side (the large-diameter portion 24 side), and the upper edge of the fastener fitting 76 is then juxtaposed in the axial direction against the inside peripheral section of the shoulder portion 20 of the second mounting member 14 via the intervening seal rubber layer 78, while the inside peripheral edge on the lower side of the fastener fitting 76 is juxtaposed in the axial direction against the outside peripheral section of the outer flanged portion 40 of the partition member body 34 via the intervening seal rubber layer 78.

Further, a bracket member 80 of round tubular shape is fastened fitting externally about the second mounting member 14. This bracket member 80 is utilized to fasten the partition member 32 and the diaphragm 74 to the second mounting member 14. Specifically, the bracket member 80 includes a middle tube fitting 82 having a thick-walled generally round tubular shape and end plate fittings 84a, 84b of annular plate shape that are juxtaposed against the axial ends of the middle tube fitting 82. The fittings 82, 84a, 84b are mated in the axial direction and fastened together with bolts. With the shoulder portion 20 of the second mounting member 14 and the fastener fitting 76 of the diaphragm 74 inserted axially between the upper end plate fitting 84a and the middle tube fitting 82, the bracket member 80 is fastened to the second mounting member 14 by bolting together the end plate fitting 84a and the middle tube fitting 82. In association with bolting together the end plate fitting 84a and the middle tube fitting 82, the shoulder portion 20 of the second mounting member 14 and the fastener fitting 76 is positioned clamped in the axial direction, with the rimming portion 60 of the first dividing wall plate 36 and the annular step portion 30 of the main rubber elastic body 16, the outside peripheral section of the outer flanged portion 66 of the second dividing wall plate 38 and the diametrically inside peripheral section or medial section of the shoulder portion 20 of the second mounting member 14, and the upper end section of the fastener fitting 76 and the outside peripheral section of the shoulder portion 20 respectively juxtaposed fluid-tightly via the intervening rubber seal layers 28, 78 etc. By so doing, through fastening of the bracket member 80 to the second mounting member 14 the partition member 32 and the diaphragm 74 is fixedly attached to the second mounting member 14, while the lower opening of the second mounting member 14 is blocked off fluid-tightly by the partition member 32 and the diaphragm 74. By then fastening the bracket member 80 to a component on the vehicle body side (not shown), the second mounting member 14 is fixedly mounted onto the vehicle body.

By thusly attaching the partition member 32 and the diaphragm 74 to the integrally vulcanization molded component of the main rubber elastic body 16 incorporating the first and second mounting members 12, 14, a pressure-receiving chamber 86 whose wall is partly defined by the main rubber elastic body 16 and which gives rise to pressure fluctuations at times of vibration input is defined to a first axial side of the partition member 32 (at top in FIG. 1), within the area of the large-diameter recess 26 of the main rubber elastic body 16 that has been blocked off by the partition member 32. To the other axial side of the partition member 32 (at bottom in FIG. 1) there will be formed an equilibrium chamber 88 whose wall is partly defined by the diaphragm 74 and which readily allows change in volume. The pressure-receiving chamber 86 and the equilibrium chamber 88 are filled with a non-compressible fluid. Water, an alkylene glycol, a polyalkylene glycol, silicone oil, or the like may be employed as the sealed non-compressible fluid, but with a view to effectively achieving vibration damping action based on flow action, e.g. resonance action, of the fluid, it is especially preferable to use a low-viscosity fluid of 0.1 Pa·s or lower. Sealing of the non-compressible fluid within the pressure-receiving chamber 86 and the equilibrium chamber 88 may be accomplished advantageously, for example, by attaching the partition member 32 and the diaphragm 74 to the main rubber elastic body 16 incorporating the first and second mounting members 12, 14 while these components are submerged in the non-compressible fluid. From the above discussion it is appreciated that the wall of the equilibrium chamber 88 is partly defined by the tapered outside peripheral section of the partition member 32 (the partition member body 34) around the through-hole 46.

In association with the partition member 32 being attached to the second mounting member 14, the open section of the peripheral groove 62 of the partition member 32 is juxtaposed fluid-tightly against the inside peripheral face of the second mounting member 14 via the intervening rubber seal layer 28 that sheathes the second mounting member 14, so that the peripheral groove 62 is closed off fluid-tightly. The inside peripheral face of the second mounting member 14 and the walls of the peripheral groove 62 are thereby cooperate to define a first orifice passage 90 that extends for a prescribed length in the circumferential direction through the outside peripheral section of the partition member 32. A first end of this first orifice passage 90 connects to the pressure-receiving chamber 86 via a connecting window (not shown) that penetrates the peripheral wall of the first dividing wall plate 36, while the other end of the first orifice passage 90 connects to the equilibrium chamber 88 through a connecting window penetrating the second dividing wall plate 38 and the connecting window 52 of the partition member body 34, which windows have been aligned with one another in axial direction. The pressure-receiving chamber 86 and the equilibrium chamber 88 thereby communicate with each other through the first orifice passage 90, allowing fluid flow between the two chambers 86, 88 through the first orifice passage 90.

Figure 5:
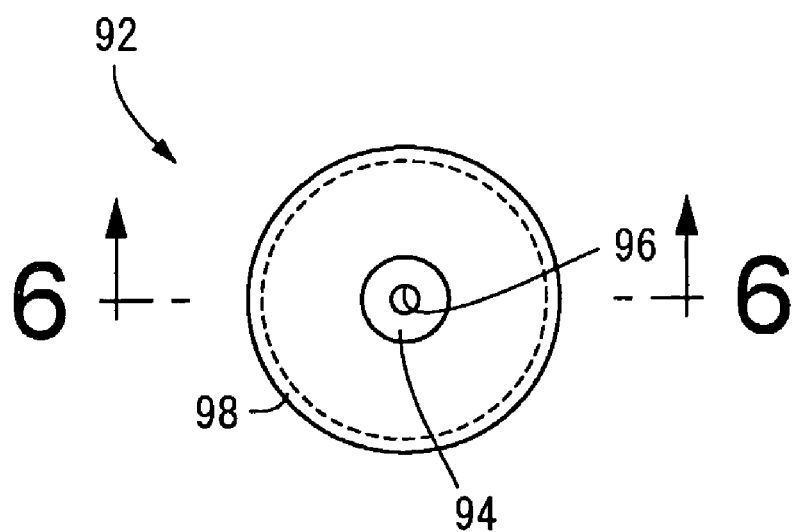
FIG. 5 is a top plane view of an oscillating plate of the engine mount of FIG. 1.
Figure 6:
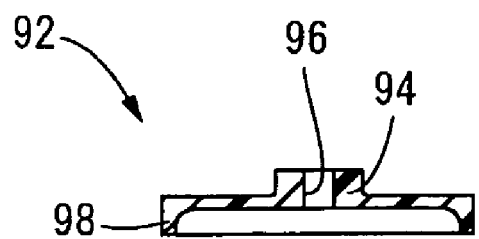
FIG. 6 is a cross sectional view of the oscillating plate taken along line 6-6 of FIG. 5.

An oscillating plate 92 composed of a piston shaped plate is disposed in the through-hole 46 of the partition member 32. As depicted in FIGS. 5 and 6, the oscillating plate 92 has a thin, generally circular disk shape, and is made of rigid synthetic resin material, metal, or the like. A boss shaped projection 94 having a small-diameter cylindrical shape projects upward from the center section of the oscillating plate 92, and the borehole of the boss shaped projection 94 opens onto the lower end face of the oscillating plate 92 so that an insertion hole 96 is formed on the center axis of the oscillating plate 92. Additionally, a rim shaped projection 98 of generally round cylindrical shape is formed on the outside peripheral edge of the oscillating plate 92, projecting downward in the axial direction.

The oscillating plate 92 and the through-hole 46 are arranged coaxially, with the rim shaped projection 98 of the oscillating plate 92 positioned along the peripheral wall of the through-hole 46 of the partition member 32. The oscillating plate 92 is positioned in opposition to and a prescribed distance away in the axial direction from the base portion of the second dividing wall plate 38 which covers the upper opening of the center hole 42 of the partition member body 34. Here, a small gap 100 is formed about the entire perimeter between the peripheral wall of the through-hole 46 and the outside peripheral section of the oscillating plate 92 having the rim shaped projection 98, and due to the presence of this gap 100, an appropriate level of axial displacement of the oscillating plate 92 is allowed.

The zone between the second dividing wall plate 38 and the oscillating plate 92 in the partition member 32 intercommunicates with the pressure-receiving chamber 86 through the through-holes 58, 68 that penetrate the first and second dividing wall plates 36, 38 and through the circular zone 72 between the first dividing wall plate 36 and the second dividing wall plate 38, and this zone is filled with the same non-compressible fluid as the pressure-receiving chamber 86. Specifically, through the through-holes 58, 68 and the circular zone 72 the zone between the oscillating plate 92 and the second dividing wall plate 38 is subject to pressure fluctuations arising in the pressure-receiving chamber 86, and thus the zone functions as part of the pressure-receiving chamber 86. As will be appreciated from the description above, in the pressure-receiving chamber 86, the oscillating plate 92 defines another part of the wall different from that defined by the main rubber elastic body 16.

In other words, to a first side of the first and second dividing wall plates 36, 38 (at top in FIG. 1) of the partition member 32, there is formed a primary fluid chamber 102 whose wall is partly defined by the main rubber elastic body 16, while to the other side of the first and second dividing wall plates 36, 38 (at bottom in FIG. 1) of the partition member 32, there is formed a auxiliary fluid chamber 104 whose wall is partly defined by the oscillating plate 92. The pressure-receiving chamber 86 incorporates this primary fluid chamber 102 and auxiliary fluid chamber 104 in its design. It will be appreciated from the above description that the dividing wall member dividing the pressure-receiving chamber 86 incorporates the first dividing wall plate 36 and the second dividing wall plate 38 in its design. Additionally, the filter orifice through which the primary fluid chamber 102 and the auxiliary fluid chamber 104 intercommunicate incorporates the through-holes 58, 68 that have been formed in the first and second dividing wall plates 36, 38 and the circular zone 72 in its design.

In this embodiment in particular, the resonance frequency of fluid flowing through the filter orifice that incorporates the aforementioned through-holes 58, 68 and the circular zone 72 has been tuned to a high frequency range on the order of 80 to 100 Hz corresponding to medium- or high-speed rumble which has been targeted for active vibration damping by the oscillating plate 92.

The connecting passage 56 that has been formed in the partition member body 34 connects at a first end thereof to the auxiliary fluid chamber 104, while the other end of the connecting passage 56 connects to the equilibrium chamber 88. That is, the connecting passage 56 constitutes a second orifice passage 106 connecting the auxiliary fluid chamber 104 and the equilibrium chamber 88 to one another and allowing flow of fluid between the two chambers 88, 104 through the second orifice passage 106.

In this embodiment in particular, the resonance frequency of fluid flowing through the first orifice passage 90 is tuned, for example, so as to produce effective vibration damping action (high attenuating action) against vibration in a low-frequency range of about 10 Hz corresponding to engine shake, on the basis of resonance action of the fluid. Meanwhile, the resonance frequency of fluid flowing through the second orifice passage 106 is tuned, for example, so as to produce effective vibration damping action against vibration in a medium-frequency range of about 20 to 40 Hz corresponding to idling vibration or low speed rumble, on the basis of resonance action of the fluid. That is, the tuning frequency of the second orifice passage 106 is set to a higher frequency range than the tuning frequency of the first orifice passage 90, and the tuning frequency of the filter orifice defined by the aforementioned through-holes 58, 68 and the circular zone 72 is set to a higher frequency range than the first and second orifice passages 90, 106. Tuning of the first orifice passage 90, the second orifice passage 106, and the filter orifice may be accomplished, for example, through adjustment of the passage length and passage cross sectional area of the orifice passages while giving consideration to characteristic values based on the rigidity of the walls of the pressure-receiving chamber 86 and the equilibrium chamber 88, i.e. on the levels of elastic deformation by the main rubber elastic body 16 and by the diaphragm 74 corresponding to pressure change levels necessary to produce a certain change in unit volume of the chambers 86, 88. Typically, the frequency at which the phase of pressure fluctuations transmitted through the orifice passage changes and assumes the resonance state can be understood as the tuning frequency of the orifice passage.

A movable plate 108 is positioned housed within the circular zone 72 of the partition member 32. This movable plate 108 has a generally circular disk shape that is slightly smaller than the circular zone 72, and is made of a rubber elastic body. A gap is formed all the way around the circumference between the peripheral wall of the circular zone 72 (i.e. the peripheral wall second dividing wall plate 38) and the outside peripheral edge of the movable plate 108. The thickness dimension of the movable plate 108 is smaller in comparison with the axial dimension of the circular zone 72. The pressure of the primary fluid chamber 102 is exerted on a first face of the movable plate 108 (at top in FIG. 1) via the through-holes 58 in the first dividing wall plate 36, while the pressure of the auxiliary fluid chamber 104 is exerted on the other face of the movable plate 108 (at bottom in FIG. 1) via the through-holes 68 in the second dividing wall plate 38. The movable plate 108 is thereby constituted so as to be displaceable in the axial direction within the circular zone 72 on the basis of a relative pressure differential between the primary fluid chamber 102 and the auxiliary fluid chamber 104.

Guide shaft portions 110, 110 are disposed in the center section of the movable plate 108 so as to project outward to either side in the axial direction. With the movable plate 108 positioned housed within the circular zone 72, each guide shaft portion 110 is displaceably inserted into an insertion hole provided in the center section of the first dividing wall plate 36 which defines the upper wall of the circular zone 72 and of the second dividing wall plate 38 which defines its lower wall, thereby positioning the movable plate 108 in the axis-perpendicular direction with respect to the circular zone 72, and approximately aligning the center axis of the movable plate 108 with the center axis of the engine mount 10 (the mount axis). Since the movable plate 108 has a corrugated shape on either face, due to the smaller striking area of the movable plate 108 against the first dividing wall plate 36 and the second dividing wall plate 38, noise is reduced, while at the same time ensuring large effective surface area of the movable plate 108 so that pressure of the primary and auxiliary fluid chambers 102, 104 is efficiently exerted on the movable plate 108.

In this embodiment in particular, the resonance frequency of the movable plate 108 is tuned to a medium frequency range, such as idling vibration or medium speed rumble, that lies within the same range as the tuning frequency range of the second orifice passage 106, and is set to a lower frequency range compared to the high range of oscillation frequency of the oscillating plate 92 and the resonance frequency of the filter orifice.

A connector rod 112 is vulcanization bonded to the center section of the diaphragm 74. The connector rod 112 is a rigid rod shaped member that extends in the axial direction, and is provided at a first axial end (at top in FIG. 1) with a screw hole 114 that opens onto the first end face; its other side in the axial direction is elongated in the axial direction and is provided at its distal end section with a male thread portion 116. A rimming portion 118 which flares diametrically outward is integrally formed in the axially medial section of the connector rod 112, and the center section of the diaphragm 74 is vulcanization bonded onto substantially the entire surface of the rimming portion 118. The connector rod 112 body is thereby vulcanization bonded to the diaphragm 74 so as to penetrate through the center section of the diaphragm 74.

An actuating member in the form of an electromagnetic actuator 120 that actuates oscillation of the oscillating plate 92 is positioned below the second mounting member 14. The electromagnetic actuator 120 in this embodiment employs a known design, and since it would be possible to employ a design like that disclosed for example in Japanese Unexamined Patent Publication No. JP-A-2003-339145, the actuator need not be discussed in detail herein except to note that a yoke member 124 which constitutes the stator is positioned spaced apart to the outside peripheral side of a movable member 122 which constitutes the slider. Coils 126, 127 and permanent magnets 128 are attached to the yoke member 124, and through the action of electromagnetic force generated between the movable member 122 and the yoke member 124 when electrical current flows to the coils 126, 127, the movable member 122 is actuated in the axial direction relative to the stator (the yoke member 124).

Specifically, the yoke member 124 is formed of a laminated steel sheet made of ferromagnetic material, and while not depicted explicitly in the drawings, has a design in which a pair of magnetic pole portions 130, 130 project in opposition along an axis-perpendicular direction on the inside peripheral face from a ring shaped outer peripheral magnetic path. The coils 126, 127 are installed on the pair of magnetic pole portions 130, 130 by being wound about the perimeter at their respective projecting distal end sections. Each of the coils 126, 127 is sheathed by an electrical insulating layer 132. Further, four permanent magnets 128 that are superposed along the lamination direction of the laminated steel sheet are affixed to the inside peripheral face of the pair of magnetic pole portions 130, 130. The inside peripheral face of each of the permanent magnets 128 is magnetized to one of S and N polarity, while the outside peripheral face of each of the permanent magnets 128 is magnetized to the other of S and N polarity. The four permanent magnets 128 are arranged with their magnetic poles differing from one another in the superposition direction. In this embodiment, four permanent magnets 128 are disposed in each coil 126, 127, accommodated within the approximate center in the axial direction.

The housing 136 of the electromagnetic actuator 120 is positioned to the outside peripheral side of the yoke member 124. The design of the housing 136 incorporates a large-diameter tubular portion 138 that extends in the axial direction, and an annular plate portion 140 of generally annular plate shape that is fastened to the upper end section of the tubular portion 138 and spreads out in the circumferential direction. The yoke member 124, which is housed within the tubular portion 138 while sandwiched in the axial direction by a pair of outer tubular washers (spacers) 141, 141, is fixedly supported suspended from the annular plate portion 140 by passing elongated fastening bolts 139 through it in the axial direction and then securing nuts 135 onto the distal ends thereof.

The housing 136 is also provided with a lead wire 142. A first end of the lead wire 142 connects to the coils 126, 127 inside the housing 136, while the other end of the lead wire 142 extends out from the outside peripheral face of the housing 136 and hooks up to a power supply 144. This enables the coils 126, 127 to be supplied with electrical current from the power supply 144 through the lead wire 142. As the power supply 144, it would be possible to employ the installed power supply for the car's electrical system, for example.

Meanwhile, the movable member 122 is disposed to the inside of the yoke member 124. The design of the movable member 122 incorporates an actuating rod 154 of elongated tube shape, a plurality of magnetic plates 155, and a plurality of inner tubular washers (spacers) 156 of round tubular shape larger in diameter than the actuating rod 154. A collar 158 that flares diametrically outward is integrally formed in the upper part of the actuating rod 154.

The magnetic plates 155 are composed of ferromagnetic material having plate shape, with an insertion hole formed in the center. The inside diameter dimension of this insertion hole is slightly larger than the actuating rod 154. The length of magnetic plates 155 at their two end edges (length in the left-right direction in FIG. 1) is shorter by a prescribed amount than the distance between the opposing faces of the pair of permanent magnets 128, 128 that have been positioned in opposition in the axis-perpendicular direction. The outside diameter dimension of the inner tubular washers (spacers) 156 is smaller than the distance between the opposing faces of the coils 126, 127 in the axis-perpendicular direction.

With a pair of assemblies, each composed of three magnetic plates 155 stacked in the axial direction, positioned in opposition in the axial direction to either side of the center inner tubular washer 156*b*, and with inner tubular washers 156*a*, 156*c* juxtaposed from outside in the axial direction against the respective stacked magnetic plate 155 assemblies, the magnetic plates 155 and the inner tubular washers 156*a, b, c* are slipped about the outside of the actuating rod 154. The magnetic plates 155 are arranged thereby so as to project outward in the axis-perpendicular direction from the actuating rod 154, with the axis-perpendicular projecting distal ends (outside peripheral end edges) of the magnetic plates 155 positioned in the axially medial section of the respective coils 126, 127, and positioned in opposition to the permanent magnets 128 in the axis-perpendicular direction. The axial distance separating the pair of assemblies of three magnetic plates 155 is smaller than the inside diameter dimension of the coils 126, 127.

The end of the connector rod 112 on the opposite side of the rimming portion 118 from the screw hole 114 is slipped into the actuating rod 154, and a ring shaped spacer 159 is installed fitting about the outside of the male thread portion 116 located at the distal end section of the connector rod 112 which is positioned projecting axially outward from the actuating rod 154, and a fastening nut 160 is then threaded and fastened thereon. Due to the fastening force of the fastening nut 160 that has been threaded onto the connector rod 112, the magnetic plates 155 and the inner tubular washers 156 is clamped in the axial direction between the fastening nut 160 and the collar 158 of the actuating rod 154, and fastened to the actuating rod 154.

Figure 7:
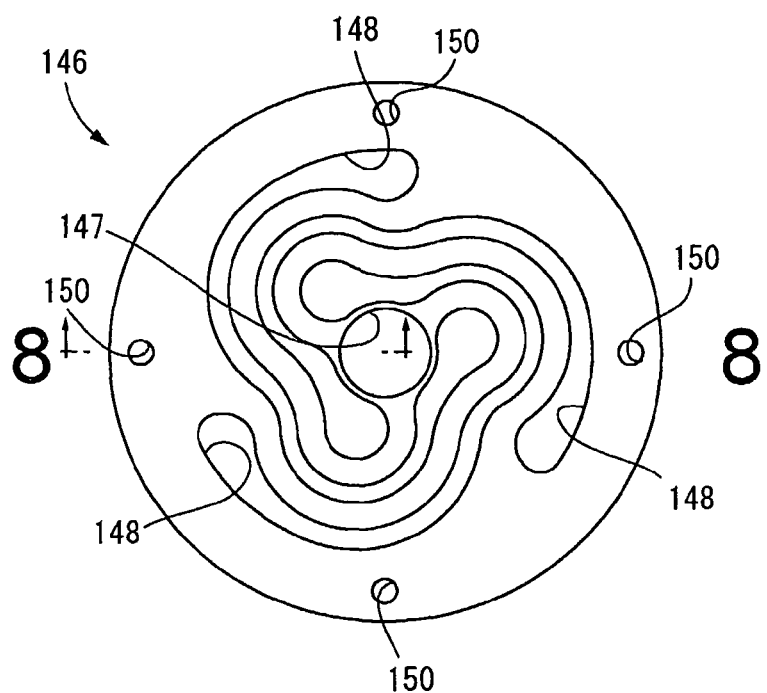
FIG. 7 is a top plane view of a supporting plate spring of the engine mount of FIG. 1.
Figure 8:
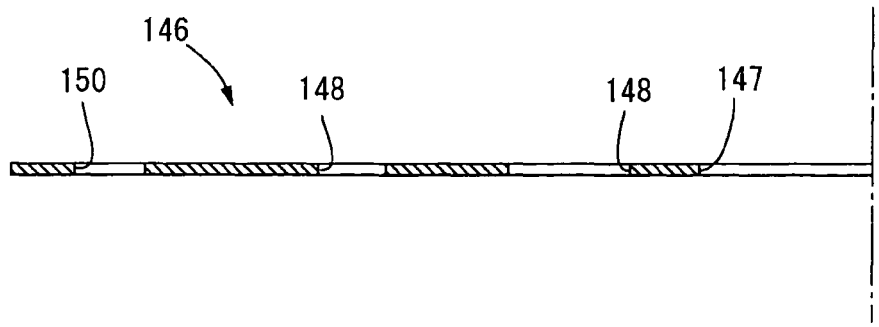
FIG. 8 is an enlarged cross sectional view taken along line 8-8 of FIG. 7.

Furthermore, a plurality of supporting plate springs 146 are disposed between the movable member 122 and the yoke member 124. As depicted in FIGS. 7 and 8, the supporting plate springs 146 have thin annular disk shape made of spring steel or the like, with a center hole 147 of circular shape formed in the center section. As lightening sections, a plurality of slits 148 are formed in the diametrically medial section of the supporting plate spring 146, and it is possible to adjust the substantial effective spring length of the supporting plate spring 146 and to tune its spring characteristics through appropriate design modification of the shape, size, number and/or locations of these slits 148. The outside peripheral section of the supporting plate spring 146 is perforated by a plurality of bolt insertion holes 150. In this embodiment in particular, the plurality of slits 148 and the plurality of bolt insertion holes 150 are respectively given identical form and are respectively formed at equidistant intervals in the circumferential direction, thereby eliminating the need to align the supporting plate springs 146 in the circumferential direction.

At least one of these supporting plate springs 146 is positioned to one axial side (at top in FIG. 1) of the coil 126, 127. With the actuating rod 154 passed through the center hole 147 of the supporting plate spring 146 and with the inside peripheral section of the supporting plate spring 146 secured clamped between the collar 158 of the actuating rod 154 and the inner tubular washer 156, is supported thereby on the movable member 122. Additionally, at least one more of the supporting plate springs 146 is positioned to the other axial side (at bottom in FIG. 1) of the coil 126, 127. With the actuating rod 154 passed through the center hole 147 of the supporting plate spring 146 and with the inside peripheral section of the supporting plate spring 146 secured clamped between the inner tubular washer 156 and the spacer 159, is supported thereby on the movable member 122.

Fastening bolts 139 for securing the yoke member 124 to the housing 136 are passed through each of the bolt insertion holes 150 that have been formed in the outside peripheral section of each of the supporting plate springs 146. The outside peripheral section of the supporting plate springs 146 are clasped, via a ring shaped washer 161, between one of the outer tubular washers 141 and the annular plate portion 140, and via another ring shaped washer 161, between the other outer tubular washer 141 and the nuts 135. The outside peripheral sections of the supporting plate springs 146 are secured clamped in the axial direction, and supported on the yoke member 124 through screw fastening of the fastening bolts 139 and the nuts 135.

With this arrangement, the movable member 122 is elastically supported at both axial sides by the supporting plate springs 146 which extend in the axis-perpendicular direction, and the movable member 122 is positioned concentrically with the housing 136 incorporating the yoke member 124, and is supported displaceably in the axial direction to the inside of the yoke member 124. Additionally, the pair of assemblies composed of three magnetic plates 155 stacked adjacently in the axial direction is positioned in opposition to the permanent magnets 128 of the yoke member 124 across a small gap in the axis-perpendicular direction.

In this embodiment in particular, the supporting plate springs 146 which support the movable member 122 at both of its axial sides are deployed in sets of two situated to either side in the axial direction, and are juxtaposed fluid-tightly against the movable member 122 in the axial direction. As the slits 148 which have been formed in each of the supporting plate springs 146 are situated at projected locations in the axial direction, the slits 148 will overlap so as to communicate with one another.

A saucer shaped cover member 163 is attached to the opening section of the tubular portion 138 of the housing 136 so as to cover the opening section of the tubular portion 138. The movable member 122 and the yoke member 124 situated inside the electromagnetic actuator 120 is thereby protected from the outside by the tubular portion 138 and the cover member 163.

The lower end face of the outside peripheral section of the annular plate portion 140 of the housing 136 in the electromagnetic actuator 120 is juxtaposed against the upper end face of the inside peripheral section of the lower end plate fitting 84b of the bracket member 80, and is bolted thereto. The electromagnetic actuator 120 is thereby securely supported on the second mounting member 14 via the bracket member 80.

As noted above, the end of the connector rod 112 on the opposite side of the rimming portion 118 thereof from the screw hole 114 is slipped into the actuating rod 154, and the distal end section of the connector rod 112 is then screwed into the fastening nut 160 so that the connector rod 112 and the actuating rod 154 are connected to one another approximately along the center axis of the mount 10.

Furthermore, the upper end face of the connector rod 112 is juxtaposed against the lower end face of the center section of the oscillating plate 92, and a fastening bolt 162 is passed through the insertion hole 96 from above the boss shaped projection 94 of the oscillating plate 92 and screwed into the screw hole 114 of the connector rod 112. The movable member 122 of the electromagnetic actuator 120 is thereby fastened to the oscillating plate 92 via the connector rod 112. From the above description it will be appreciated that the electromagnetic actuator 120 is situated to the opposite side of the oscillating plate 92 from the pressure-receiving chamber 86.

Through flow of electrical current to the coils 126, 127 in one direction about the diametrical axis of the magnetic pole portion 130 in the electromagnetic actuator 120, an N pole is produced to the diametrical inward side of the yoke member 124, while an S pole is produced to the diametrical outward side. When the current flow to the coils 126, 127 is reversed, the N poles and S poles of the plurality of permanent magnets 128 attached to the yoke member 124 will weaken and strengthen in alternating fashion. As a result, force in one direction and force in the other direction will act in alternating fashion upon the movable member 122, causing the movable member 122 to undergo reciprocating motion to either side in the axial direction from its equilibrium position in the absence of current flow (the position depicted in FIG. 1). In association with reciprocating motion of the moving member 122, the oscillating plate 92 undergoes actuated oscillation in the axial direction within the through-hole 46 of the partition member 32.

Figure 9:
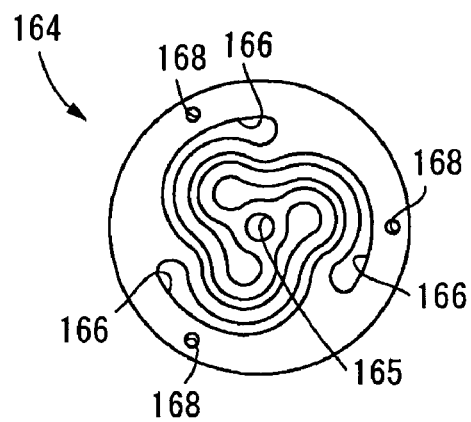
FIG. 9 is a top plane view of a part of a plate spring of the engine mount of FIG. 1.

The boss shaped projection 94 which projects from the upper end section of the oscillating plate 92 is linked to the partition member 32 via a plate spring 164. As depicted in FIG. 9, this plate spring 164 has a thin annular disk shape made of spring steel or the like, with a center hole 165 of circular shape formed in the center section. The inside diameter dimension of the plate spring 164 is smaller than the outside diameter dimension of the boss shaped projection 94 of the oscillating plate 92, while the outside diameter dimension of the plate spring 164 is slightly smaller in comparison with the outside diameter dimension of the step portion 44 of the center hole 42 of the partition member 32. As lightening sections, a plurality of slits 166 are formed in the diametrically medial section of the plate spring 164 and penetrate through the plate in its thickness direction; and a plurality of bolt insertion holes 168 are formed at locations corresponding to the screw holes 50 which have been formed in the step portion 44 of the center hole 42 of the partition member 32 in the outside peripheral section. In this embodiment, three slits 166 and three bolt insertion holes 168 are formed at equidistant intervals in the circumferential direction.

The center hole 165 of the plate spring 164 and the insertion hole 96 of the oscillating plate 92 are superposed at mutually projected locations in the axial direction, and the fastening bolt 162 is then passed through the center hole 165 and the insertion hole 96, and threadably fastened with the inside peripheral section of the plate spring 164 positioned clamped between the head of the fastening bolt 162 and the boss shaped projection 94. The outside peripheral section of the plate spring 164 rests on the step portion 44 of the center hole 42, the bolt insertion holes 168 of the plate spring 164 are aligned with the screw holes 50 of the step portion 44, and the outside peripheral section of the plate spring 164 is then bolted to the partition member body 34. With this arrangement, the plate spring 164 is disposed so as to extend in the axis-perpendicular direction on the opposite side of the oscillating plate 92 from the electromagnetic actuator 120, and the oscillating plate 92 is elastically linked to and supported in the axial direction by the partition member 32, by means of the plate spring 164. That is, in association with actuation of the movable member 122 in the axial direction, the plate spring 164 experiences elastic deformation in the axial direction as well, and by virtue of being positioned in the axis-perpendicular direction by the plate spring 164, the oscillating plate 92 is maintained in a state with the oscillating plate 92 and the through-hole 46 positioned concentrically. In other words, the gap 100 is maintained all the way around the circumference between the outside peripheral edge of the oscillating plate 92 and the peripheral wall of the through-hole 46.

In the same way as the zone between the plate spring 164 and the second dividing wall plate 38, the zone between the plate spring 164 and the oscillating plate 92 is filled with fluid through the slits 166 of the plate spring 164, so that the zone constitutes part of the auxiliary fluid chamber 104.

The stopper 48 that is formed at the lower opening of the through-hole 46 of the partition member 32, and the downwardly extending projecting distal end section of rim shaped projection 98 of the oscillating plate 92, are positioned in opposition in the axial direction coincident with the actuation direction of the oscillating plate 92. The outside diameter dimension of the oscillating plate 92 and of the rim shaped projection 98 are smaller in comparison with the diameter dimension of the through-hole 46, while the outside peripheral edge of the oscillating plate 92 and the outside peripheral edge of the rim shaped projection 98 are positioned inwardly in the axis-perpendicular direction from the basal end of the partition member 32 at the stopper 48 projection side thereof, so that the gap 100 formed between the outside peripheral face of the oscillating plate 92 and the inside peripheral face of the through-hole 46 extends with generally unchanging oblong cross section in the circumferential direction. While no particular limitation is imposed on the axial length of the gap 100, in this embodiment, it is one-fourth to two-thirds the axial length of the through-hole 46. The inside peripheral edge of the rim shaped projection 98 is positioned outward in the axis-perpendicular direction from the inside peripheral edge of the stopper 48.

Figure 10:
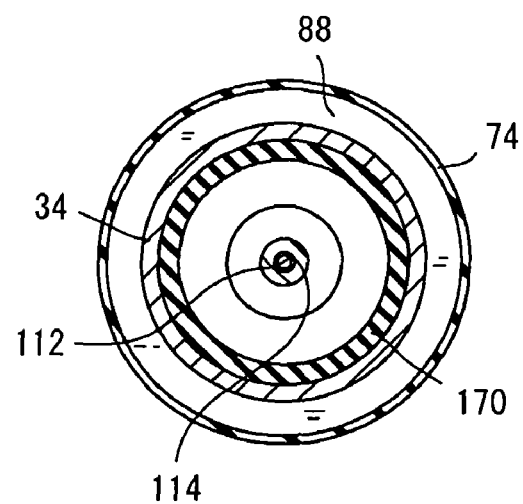
FIG. 10 is a cross sectional view taken along line 10-10 of FIG. 1.
Figure 11:
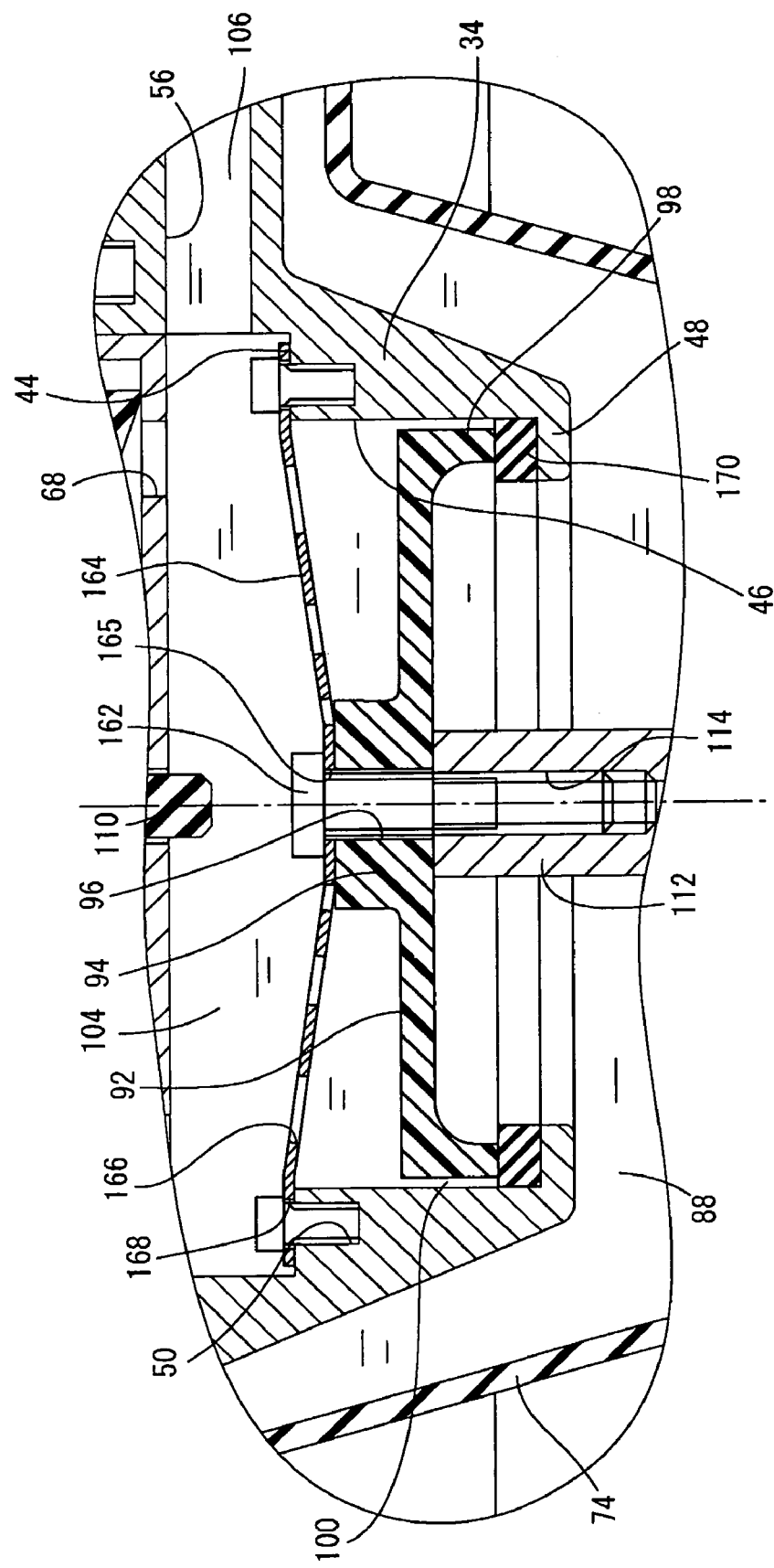
FIG. 11 is an enlarged view in vertical cross section of a part of an engine mount of construction according to another embodiment of the present invention.

In this embodiment in particular, the face of the stopper 48 on the side thereof which faces towards the rim shaped projection 98 of the oscillating plate 92 is sheathed by a rubber cushioning layer 170 as the cushioning member. As depicted in FIGS. 10 and 11, the rubber cushioning layer 170 has an annular shape that extends continuously in the circumferential direction with generally unchanging oblong cross section, and is made of a rubber elastic body. The lower end face of the rubber cushioning layer 170 is juxtaposed against the stopper 48 on the face thereof opposing the oscillating plate 92, while the outside peripheral face of the rubber cushioning layer 170 is juxtaposed against the inside peripheral face of the through-hole 46, with these juxtaposed faces being affixed to the partition member 32 through vulcanization bonding or other means. The inside peripheral edge of the rubber cushioning layer 170 is positioned at approximately the same location in the axis-perpendicular direction as the inside peripheral edge of the stopper 48, and is positioned inwardly in the axis-perpendicular direction from the inside peripheral edge of the rim shaped projection 98. Through this arrangement, the upper end face of the rubber cushioning layer 170 is positioned in opposition in the axial direction to the lower end face of the rim shaped projection 98, over a larger planar area than the lower end thereof opposing the stopper 48.

As depicted in FIG. 1, the oscillating plate 92 is positioned in the axially medial section of the through-hole 46, and with the plate spring 164 held in generally disk shape, the two axial ends of the gap 100 between the oscillating plate 92 and the through-hole 46 open into the through-hole 46. The matter of whether fluid flow takes place through the gap 100 between the auxiliary fluid chamber 104 situated to one side of the oscillating plate 92 and the equilibrium chamber 88 situated to the other side is not an essential element in the present invention. In this embodiment, in addition to setting the oscillation frequency of the oscillating plate 92 to a sufficient high frequency range compared to the tuning frequencies of the first and second orifice passages 90, 106, the viscosity of the non-compressible fluid filling the auxiliary fluid chamber 104 and the equilibrium chamber 88 has not been set to a value that effectively give rise to fluid flow action through the gap 100, and accordingly is substantially no fluid flow takes place through the gap 100.

With the oscillating plate 92 at a stop in the axially medial section of the through-hole 46, and with it undergoing actuated oscillation in the axial direction within the through-hole 46, the two axial ends of the gap 100 remain open.

Meanwhile, as depicted in FIG. 11, when the oscillating plate 92 is displaced from the pressure-receiving chamber 86 side (the auxiliary fluid chamber 104 side) towards the equilibrium chamber 88 side, the rim shaped projection 98 becomes juxtaposed against the stopper 48 via the intervening rubber cushioning layer 170, and the displaced end of the oscillating plate 92 situated on one side thereof in the axial direction (at bottom in FIGS. 1 and 11) is regulated thereby.

From the preceding it will be appreciated that the stopper 48 according to this embodiment is disposed in the through-hole 46, to the side towards which the oscillating plate 92 undergoes displacement from the pressure-receiving chamber 86 side towards the equilibrium chamber 88 side.

Accordingly, with the rim shaped projection 98 of the oscillating plate 92 and the rubber cushioning layer 170 of the stopper 48 positioned in abutment in the axial direction, the axial lower end of the gap 100 overlaps the upper end face of the rubber cushioning layer 170 so that fluid flow is not take place through the gap 100 between the auxiliary fluid chamber 104 and the equilibrium chamber 88.

In the automotive engine mount 10 having the construction described above, at times of input of low-frequency vibration such as engine shake, since the resonance frequency of the movable plate 108 has been set to a higher frequency range than the frequency in question, displacement of the movable plate 108 does not take place effectively, and pressure absorption of the primary fluid chamber 102 through displacement of the movable plate 108 is inhibited. As a result, a relative pressure differential will advantageously arise between the primary fluid chamber 102 and the equilibrium chamber 88 so as to ensure a sufficient level of fluid flow through the first orifice passage 90, and thus vibration damping action based on the flow action, e.g. the resonance action, of the fluid is effectively achieved.

Through feedback control, e.g. adaptive control using the engine ignition signal of the power unit as a reference signal and the vibration sensor signal of a component to be damped (such as the vehicle body) as an error signal for example, electrical current to the coils 126, 127 is controlled thereby in order to actuate oscillation of the movable member 122 in the axial direction. As a result, at times of input of low-frequency vibration such as engine shake for example, through actuation control of the oscillating plate 92 such that pressure fluctuations of the auxiliary fluid chamber 104 are exerted on the primary fluid chamber 102 on the basis of displacement of the movable plate 108 and effectively give rise to pressure fluctuations between the primary fluid chamber 102 and the equilibrium chamber 88, it is possible to more effectively achieve vibration damping action by the first orifice passage 90.

In this embodiment, the head of the fastening bolt 162 which has been fastened to the boss shaped projection 94 of the oscillating plate 92, and the guide shaft portions 110 of the movable plate 108, are positioned in opposition a prescribed distance apart in the axial direction. It is accordingly possible, for example, to actuate the oscillating plate 92 from the equilibrium chamber 88 side towards the pressure-receiving chamber 86 side so that the guide shaft portions 110 are pushed by the fastening bolt 162, and thereby hold the movable plate 108 in a state of abutment against the first dividing wall plate 36. The first through-holes 58 of the first dividing wall plate 36 is covered by the movable plate 108 and displacement of the movable plate 108 is constrained, thus making it possible to substantially avoid flow action of fluid from arising through the second orifice passage 106, that is, to block off the second orifice passage 106. For this reason, by maintaining the second orifice passage 106 in a blocked off state at times of input of low-frequency vibration such as engine shake, pressure leakage from the pressure-receiving chamber 86 through the second orifice passage 106 is prevented reliably, so that the vibration damping effect afforded by the first orifice passage 90 may be more effectively achieved.

Moreover, at times of input of high-frequency vibration such as medium- to high-speed rumble in a higher frequency range than the tuning frequency ranges of the first and second orifice passages 90, 106, the first and second orifice passages 90, 106 will become substantially clogged. At such times, internal pressure in the pressure-receiving chamber 86 which incorporates the primary fluid chamber 102 and the auxiliary fluid chamber 104 is controlled through actuated oscillation of the oscillating plate 92 at a frequency corresponding to the cycle of the high-frequency vibration, and will effectively produce positive and active vibration damping action against the high-frequency vibration.

In this embodiment in particular, the resonance frequency of fluid flowing through the first and second through-holes 58, 68 and through the circular zone 72 is tuned to a high frequency range such as medium- to high-speed rumble in order to achieve active vibration damping action by the oscillating plate 92. In combination with that, pressure fluctuations arising in the primary fluid chamber 102 and the auxiliary fluid chamber 104 on the basis of actuated oscillation of the oscillating plate 92 are transmitted efficiently utilizing the resonance action etc. of fluid by the filter orifice. The vibration transmission characteristics of the first mounting member 12 and the second mounting member 14 linked by the main rubber elastic body 16 may then be adjusted through positive and active control of the pressure fluctuations arising in the primary fluid chamber 102 and the auxiliary fluid chamber 104, to advantageously produce the desired vibration damping action.

Furthermore, at times of input of medium-frequency vibration such as idling vibration to the automotive engine mount 10, because a sufficient level of fluid flow through the second orifice passage 106 is ensured based on the relative pressure differential arising between the auxiliary fluid chamber 104 and the equilibrium chamber 88 when pressure fluctuations of the primary fluid chamber 102 are exerted on the auxiliary fluid chamber 104 through displacement of the movable plate 108, vibration damping action is obtained based on the flow action, e.g. resonance action, of the fluid. In this embodiment in particular, since the resonance frequency of the movable plate 108 is tuned to a range of medium-frequency vibration such as idling vibration, the resonance action of the movable plate 108 can be utilized to more effectively give rise to pressure fluctuations of the auxiliary fluid chamber 104, thereby ensuring high level of fluid flow through the second orifice passage 106.

Accordingly, in the automotive engine mount 10 according to this embodiment, at times of input of medium-frequency vibration such as idling vibration, the oscillating plate 92 undergoes actuated displacement from the pressure-receiving chamber 86 side towards the equilibrium chamber 88 side, and the rim shaped projection 98 of the oscillating plate 92 becomes positioned in abutment against the rubber cushioning layer 170 of the partition member 32 and held juxtaposed against the stopper 48 via the intervening rubber cushioning layer 170. Thus, a first end of the gap 100 is blocked off by the stopper 48 that is furnished with the rubber cushioning layer 170, the preventing fluid from flowing between the auxiliary fluid chamber 104 and the equilibrium chamber 88 through the gap 100 present between the outside peripheral face of the oscillating plate 92 and the inside peripheral face of the through-hole 46. As a result, pressure leakage from the pressure-receiving chamber 86 composed of the primary fluid chamber 102 and the auxiliary fluid chamber 104 out though the gap 100 is reliably inhibited, and a sufficient level of fluid flow through the second orifice passage 106 is effectively ensured so that the second orifice passage 106 may provide highly effective vibration damping action.

In this embodiment in particular, owing to the rim shaped projection 98 integrally formed extending in the circumferential direction along the outside peripheral edge of the oscillating plate 92, the opposed sections of the piston shaped oscillating plate 92 and the cylinder shaped through-hole 46 can be given considerable length in the axial direction. This has the effect of increasing the effective piston surface area of the oscillating plate 92, and of inhibiting pressure leakage from the pressure-receiving chamber 86 from the gap 100, thereby affording efficient and stable pressure control of the pressure-receiving chamber 86.

Moreover, in this embodiment, since the oscillating plate 92 is juxtaposed against the stopper 48 via the intervening rubber cushioning layer 170, the resilient action of the rubber cushioning layer 170 can be utilized to reduce the occurrence of noise when the oscillating plate 92 strikes the stopper 48. In particular, at the mutually opposed faces of the oscillating plate 92 (specifically the rim shaped projection 98) and the rubber cushioning layer 170, since the opposed face of the rubber cushioning layer 170 is large in comparison with the opposed face of the oscillating plate 92 it is possible to position the oscillating plate 92 in stable abutment against the rubber cushioning layer 170, and in addition to press the oscillating plate 92 against the rubber cushioning layer 170 so as to become wedged against it, thereby inducing compressive deformation of the rubber cushioning layer 170 in the axial direction with the oscillating plate 92 in abutment against it. The fluidtightness of the gap 100 may be improved thereby, and pressure leakage from the pressure-receiving chamber 86 through the gap 100 may be more advantageously avoided.

Consequently, according the automotive engine mount 10 of this embodiment, there is no need for the gap 100 to be made excessively small in order to prevent pressure leakage from the pressure-receiving chamber 86, and thus the gap may have size tolerance sufficient to avoid interference of the oscillating plate 92 with the through-hole 46. For this reason, actuated displacement of the oscillating plate 92 can be stabilized, and pressure leakage from the pressure-receiving chamber 86 through the gap 100 around the oscillating plate 92 can be reliably prevented, improving the vibration damping capabilities.

Furthermore, in this embodiment, in the event that, with the oscillating plate 92 abutting the rubber cushioning layer 170 of the stopper 48 and the gap 100 closed off thereby, a high level of negative pressure should arise in the pressure-receiving chamber 86 due to input of large-amplitude vibration, the oscillating plate 92 experiences displacement from the equilibrium chamber 88 side towards the pressure-receiving chamber 86 side under the action of the negative pressure, and the oscillating plate 92 separate from the rubber cushioning layer 170. The gap 100 thereby assumes the communicating state, whereupon the pressure in the pressure-receiving chamber 86 and the pressure in the equilibrium chamber 88 rapidly return to equilibrium based on fluid flow through the gap 100. For this reason, the occurrence of noise and vibration due to cavitation bubbles, attributed to excessive negative pressure in the pressure-receiving chamber 86, can be advantageously reduced.

Moreover, in this embodiment, the oscillating plate 92 is supported by the plate spring 164 at one axial side thereof on the second mounting member 14 via the partition member 32, while the other axial side of the oscillating plate 92 is supported on the second mounting member 14 via the output member of the electromagnetic actuator 120. In particular, the movable member 122 of the output member of the electromagnetic actuator 120 is supported at both axial sides thereof on the second mounting member 14 via the supporting plate springs 146. The effect of this is to effectively inhibit displacement of the oscillating plate 92 not only in the axis-perpendicular direction, but also displacement in a twisting direction so that the oscillating plate 92 is stability positioned and supported on the second mounting member 14, as a result of which interference of the oscillating plate 92 with the through-hole 46 can be prevented, and actuated displacement of the oscillating plate 92 can be further stabilized.

While the present invention has been described in detail in its presently preferred embodiment, it is to be understood that the invention is by no means limited to the details of the illustrated embodiment and may be embodied with various changes, modifications and improvements which may occur to those skilled in the art, without departing from the spirit and scope of the invention.

For example, the shape, size, construction, number, placement and other aspects of the oscillating plate 92, the plate spring 164, the stopper 48, the rubber cushioning layer 170, the first orifice passage 90, the second orifice passage 106, the filter orifice, the movable plate 108 etc. are not limited to those taught herein by way of example. In particular, the plate spring 164 and the rubber cushioning layer 170 may be provided on an as-needed basis and are not essential elements.

In the embodiment above, the stopper 48 was disposed to a first axial side (the bottom in FIGS. 1 and 11) towards which the oscillating plate 92 is displaced from the pressure-receiving chamber 86 side to the equilibrium chamber 88 side in the through-hole 46; however, the stopper 48 could instead be disposed to the other axial side towards which the oscillating plate 92 is displaced from the equilibrium chamber 88 side to the pressure-receiving chamber 86 side. By so doing, through displacement of the oscillating plate 92 from the equilibrium chamber 88 side towards the pressure-receiving chamber 86 side so that the upper end of the outside peripheral section of the oscillating plate 92 comes into abutment against the stopper 48, the upper opening of the gap 100 is closed off by the stopper 48.

Moreover, while in the embodiment above, the rim shaped projection 98 and the rubber cushioning layer 170 that constitute the abutting sections of the oscillating plate 92 and the stopper 48 each have a shape extending continuously in the circumferential direction, it would be possible for example for at least one of the abutting sections of the oscillating plate 92 and the stopper 48 to be segmented in the circumferential direction, and for projections projected from the other section to fit in the circumferential interstices between the segments of the first section and block off the circumferential interstices, thereby blocking off the gap 100 between the outside peripheral face of the oscillating plate 92 and the inside peripheral face of the through-hole 46.

In the embodiment above, the movable member employed a movable plate mechanism whereby, like the movable plate mechanism taught for example in Japanese Unexamined Patent Publication No. JP-A-01-93638, U.S. Pat. No. 7,322,570 and Japanese Unexamined Patent Publication No. JP-A-2006-97823, the movable plate 108 is positioned accommodated in an unattached state within a prescribed holding area (the circular zone 72) so as to be finely displaceable in the thickness direction within the holding area, and by means of holes formed in the holding area (through-holes 58, 68), pressure of the primary fluid chamber 102 is exerted on one face of the movable plate 108 while pressure of the auxiliary fluid chamber 104 is exerted on the other face of the movable plate 108, whereby relative pressure differentials between the primary fluid chamber 102 and the auxiliary fluid chamber 104 is absorbed on the basis of fine displacement of the movable plate 108 within the holding area, and pressure absorption by the movable plate 108 in excess of an allowable displacement level is prevented. However, the movable member employed in the present invention is not limited to the movable plate mechanism shown herein by way of example, and it would be possible to employ various other mechanisms for limiting the level of fluid flow between the primary fluid chamber 102 and the auxiliary fluid chamber 104. As a specific example, it would be possible to employ a movable film mechanism as taught inter alia in Japanese Unexamined Patent Publication Nos. JP-A-2000-213586, JP-A-07-71506, or JP-A-11-101294 for example, wherein at least the outside peripheral section of the movable plate is defined by a partition rubber elastic plate, with the partition rubber elastic plate being attached at its outside peripheral edge to the partition member or to the second mounting member thereby fluidtightly partitioning the primary fluid chamber and the auxiliary fluid chamber so that a relative pressure differential arising between the primary fluid chamber and the auxiliary fluid chamber and exerted on the respective faces of the partition rubber elastic plate is absorbed on the basis of elastic displacement and/or elastic deformation of the partition rubber elastic plate based on this pressure differential between the primary fluid chamber and the auxiliary fluid chamber while at the same time preventing large pressure absorption through elastic deformation of the partition rubber elastic plate. Alternatively, it would be possible to employ a movable plate or movable film mechanism as taught in U.S. Pat. No. 7,188,830, whereby a plurality of elastic projecting portions are disposed projecting from both faces of the movable plate, and the movable plate is constrained in localized fashion by means of these elastic projecting portions being held clasped between the walls of the holding area of the movable plate, with the spaces between the walls of the holding area and those sections of the movable plate devoid of elastic projecting portions defining fluid channels that connect the primary fluid chamber and the auxiliary fluid chamber with one another.

Moreover, the partition member body 34 need not be a single component as shown herein by way of example. Instead, several components may be assembled together, for example, which has the effect of improving freedom in tuning of the shape, length, cross sectional area etc. of the second orifice passage.

Additionally, the electromagnetic actuator employed may be one with a construction in which, as shown by way of example herein, the permanent magnets 128 are disposed on the slider side while the coils 126, 127 and the yoke member 124 are disposed on the stator side so that the N poles and S poles on the slider side increase and decrease in alternating fashion by means of the magnetic field created when current is passed through the coils 126, 127, causing the slider to undergo reciprocating motion; or an electromagnetic actuator of conventional construction such as that disclosed in Japanese Unexamined Patent Publication No. JP-A-2000-213586 or U.S. Pat. No. 6,422,546, in which, using a single permanent magnet, the slider is actuated to one side in the axial direction through the action of a magnetic field created when current is passed through a coil, while the slider is actuated to the other side in the axial direction using the urging force of a coil spring or the like.

Furthermore, a pneumatic actuator that uses atmospheric pressure or negative pressure such as described above could be used in place of the electromagnetic actuator 120 employed in the embodiment above.

Furthermore, fastening the actuating member, e.g. the electromagnetic actuator or the pneumatic actuator, to the second mounting member 14 in order to finish the mount 10 is not an essential element herein; the actuating member could instead fastened to the second mounting member 14 to link the oscillating plate 92 to the output member after the mount 10 has been finished.

Additionally, while the embodiment herein describes the invention reduced to practice in an automotive engine mount, the invention could be implemented analogously in a body mount or diff mount, or in vibration damping devices for various non-automotive vibrating bodies as well.

What is claimed is:

1. A fluid filled type vibration damping device comprising:
a rubber elastic body elastically connecting a first mounting member and a second mounting member;
a partition member supported on the second mounting member;
a pressure-receiving chamber whose wall is partly defined by the rubber elastic body; an equilibrium chamber whose wall is partly defined by a flexible film, the pressure-receiving chamber and the equilibrium chamber being formed to either side of the partition member and filled with a non-compressible fluid;
a movable member of limited displacement or limited deformation disposed within the pressure-receiving chamber, the pressure-receiving chamber being partitioned by the movable member thereby forming a primary fluid chamber whose wall is partly defined by the rubber elastic body and to which vibration is input, and an auxiliary fluid chamber whose wall is partly defined by an oscillating plate and whose pressure is controllable through actuated oscillation of the oscillating plate;
a first orifice passage connecting the primary fluid chamber to the equilibrium chamber; and
a second orifice passage connecting the auxiliary fluid chamber to the equilibrium chamber, the second orifice passage being tuned to a higher frequency range than the first orifice passage,
wherein a through-hole is formed in the partition member that partitions the auxiliary fluid chamber and the equilibrium chamber,
the oscillating plate is housed within the through-hole with a gap provided between an outside peripheral face of the oscillating plate and an inside peripheral face of the through-hole whereby the oscillating plate is displaceable in an axial direction within the through-hole,
the wall of the auxiliary fluid chamber is partly defined by the oscillating plate,
a stopper abutted by the oscillating plate during displacement to one side in the axial direction is provided, with the gap becoming closed off when the oscillating plate is in a state of abutment against the stopper, and
wherein an electromagnetic actuator furnished with a coil member and an output member that receives actuating force through flow of electrical current to the coil member is used as an actuating member for actuating oscillation of the oscillating plate, with the electromagnetic actuator disposed on an opposite side of the oscillating plate from the pressure-receiving chamber, and with the output member penetrating through the flexible film and linked to the oscillating plate.

2. The fluid filled type vibration damping device according to claim 1, wherein the stopper is provided in the through-hole at a side towards which the oscillating plate displaces when moving from a pressure-receiving chamber side towards an equilibrium chamber side, pressure of the pressure-receiving chamber is exerted on a first face of the oscillating plate while pressure of the equilibrium chamber is exerted on another face of the oscillating plate, and with the oscillating plate abutting the stopper and closing off the gap, negative pressure arising in the pressure-receiving chamber when vibration is input displaces the oscillating plate from the equilibrium chamber side towards the pressure-receiving chamber side and places the gap in a communicating state.

3. The fluid filled type vibration damping device according to claim 1, wherein a plate spring that extends in an axis-perpendicular direction is positioned between the oscillating plate and the partition member, with the oscillating plate being elastically linked to and supported in the axial direction on the partition member through the plate spring.

4. The fluid filled type vibration damping device according to claim 1, wherein a cushioning member is disposed on at least one of abutting portions of the oscillating plate and the stopper.

5. The fluid filled type vibration damping device according to claim 1, wherein the through-hole is formed extending in a direction of opposition of the pressure-receiving chamber and the equilibrium chamber in a center section of the partition member, the wall of the equilibrium chamber is partly defined by an outside peripheral section of the partition member about the through-hole, and an outside peripheral face of the partition member has a tapered shape of decreasing diameter from a pressure-receiving chamber side at a first side thereof in the axial direction towards an equilibrium chamber side at another side in the axial direction.

6. The fluid filled type vibration damping device according to claim 5, wherein the stopper is integrally formed at an equilibrium chamber side opening section of the through-hole so as to extend radially inward of the opening section of the through-hole with a given cross sectional shape, over an entire circumference of the through-hole.

* * * * *